United States Patent [19]

Spinelli

[11] Patent Number: 5,019,628
[45] Date of Patent: May 28, 1991

[54] SILICONE CONTAINING ACRYLIC STAR POLYMERS

[75] Inventor: Harry J. Spinelli, Wilmington, Del.

[73] Assignee: E. I. du Pont de Nemours and Company, Wilmington, Del.

[21] Appl. No.: 507,277

[22] Filed: Apr. 10, 1990

[51] Int. Cl.$^5$ .............................. C08F 275/00
[52] U.S. Cl. .................. 525/288; 526/279; 525/293; 525/901; 525/910; 528/901
[58] Field of Search .......... 525/288, 293, 910, 901; 528/901; 526/279

[56] References Cited

U.S. PATENT DOCUMENTS

| | | |
|---|---|---|
| 4,120,570 | 10/1978 | Gaylord . |
| 4,152,508 | 5/1979 | Ellis et al. . |
| 4,153,641 | 5/1979 | Deichert et al. .................. 525/288 |
| 4,189,546 | 2/1980 | Deichert et al. . |
| 4,254,248 | 3/1981 | Friends et al. . |
| 4,424,328 | 1/1984 | Ellis .................................. 526/279 |
| 4,659,782 | 4/1987 | Spinelli ............................ 525/293 |
| 4,659,783 | 4/1987 | Spinelli ............................ 525/293 |
| 4,810,756 | 3/1989 | Spinelli . |

FOREIGN PATENT DOCUMENTS 1004640A 1/1989 Japan .

Primary Examiner—Joseph L. Schofer
Assistant Examiner—Fred Zitomer
Attorney, Agent, or Firm—Charles J. Shoaf

[57] ABSTRACT

Acrylic star polymers containing polysiloxanylalkyl ester groups in their arms and terminal organo groups containing a polymerizable carbon-carbon double bond are useful for improving polymer compositions for contact lenses.

11 Claims, 1 Drawing Sheet

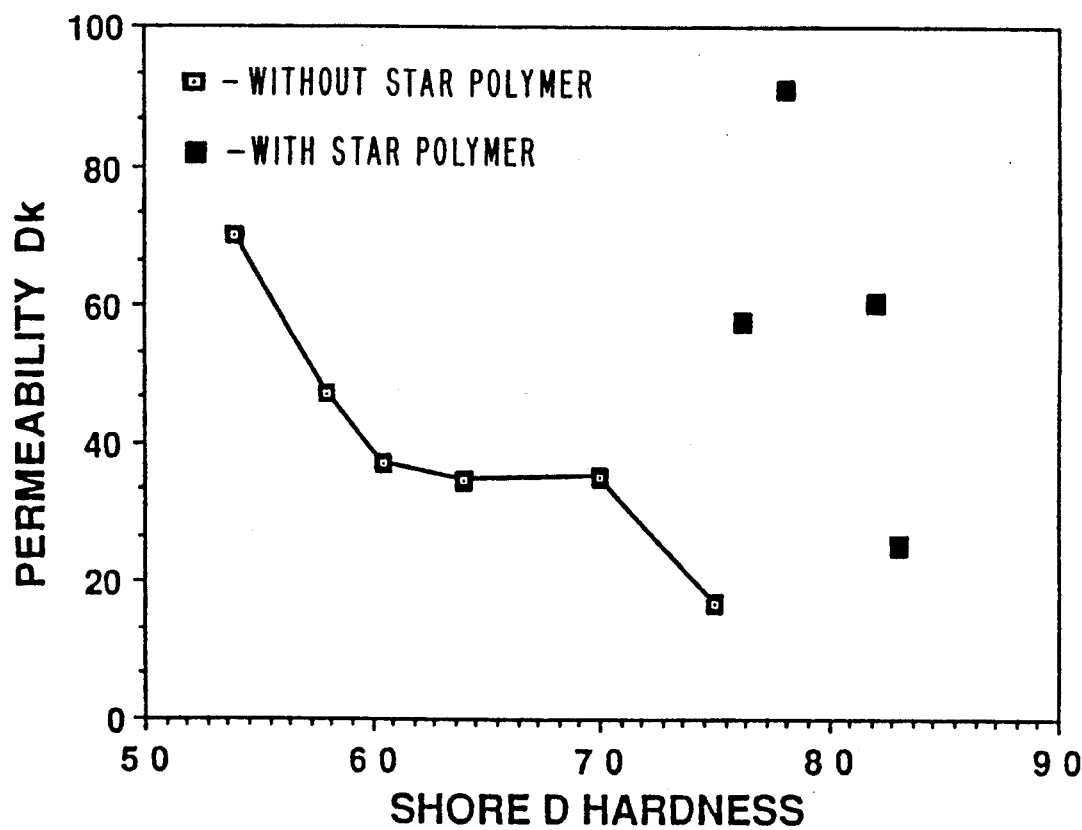

SILICONE CONTAINING ACRYLIC STAR POLYMERS

FIELD OF THE INVENTION

This invention relates to novel star polymers containing polysiloxanyl groups in their arms which can be used in combination with other polymers to improve the properties of the other polymers, for example to impart an improved combination of oxygen permeability and hardness in polysiloxanylalkyl acrylic polymers used for contact lens applications.

BACKGROUND OF THE INVENTION

U.S. Pat. Nos. 3,808,178 and 4,120,570, issued to N. E. Gaylord in 1974 and 1978 respectively, concerns linear random copolymers of polysiloxanyl and alkyl acrylates and methacrylates which have increased oxygen permeability, as compared to the alkyl methacrylates alone for example. Use of the polymers in contact lenses for correcting visual defects of the human eye is taught. Further modifications of such polymers with an itaconate ester, and preferably including a crosslinking agent and a hydrophilic monomer, are disclosed in U.S. Pat. No. 4,152,508 issued to E. J. Ellis et al. (1979).

U.S. Pat. No. 4,254,248 issued to G. D. Friends et al. (1981) concerns acrylate and methacrylate soft contact lenses using as a comonomer polysiloxanes end-capped with polymerizable unsaturated groups. The copolymers have high tear strengths and a high modulus of elasticity. Such comonomers are also disclosed in U.S. Pat. No. 4,189,546 issued to W. G. Deichert et al. (1980) to make polymeric shaped articles for biomedical applications.

U.S. Pat. Nos. 4,659,782 and 4,659,783 issued to H. J. Spinelli in 1987 teach the preparation of acrylic star polymers with crosslinked acrylic cores and acrylic arms. Such star polymers can contain reactive functional groups, including carbon-carbon double bonds as disclosed in U.S. Pat. No. 4,810,756 to Spinelli (1989). The incorporation of the star polymers into other polymer compositions to give improved properties is disclosed. The use of functionalized star polymers in clear or filled acrylic sheet or castings is referred to in U.S. Pat. No. 4,810,756.

In the prior art, as represented for example by the above Gaylord patents, improvements in one polymer property, such as oxygen permeability, are frequently gained at the expense of another property, such as hardness or machineability. Optical clarity must remain unaffected as well. Improved methods and materials which can provide polymeric contact lens compositions having improved combinations of properties remain highly desirable.

An object of this invention is a novel acrylic star polymer which is compatible with and can be used in polymer compositions for contact lenses to provide improved properties. Another object is a novel star polymer which can be incorporated into polysiloxanyl-, alkyl-(meth)acrylate copolymers during bulk polymerization of the copolymer to provide a novel combination of oxygen permeability and hardness and not adversely affect optical clarity.

SUMMARY OF THE INVENTION

This invention provides a novel silicone-containing acrylic star polymer comprised of a crosslinked core derived from one or more (meth)acrylate monomers and attached to the core a plurality of linear copolymeric arms with an unattached free end which arms are derived from one or more (meth)acrylate monomers, wherein about 5 to 100% by weight of the (meth)acrylate monomers from which the arms are derived are one or more polysiloxanylalkyl esters, preferably of the formula:

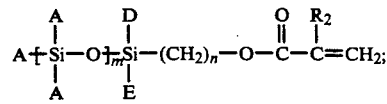

wherein D and E are selected from the group consisting of $C_1$–$C_5$ alkyl groups, phenyl groups and a group of the structure

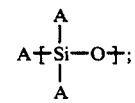

where A is selected from the group consisting of $C_1$–$C_5$ alkyl groups and phenyl groups; $R_2$ is selected from the group of hydrogen and methyl; "m" is an integer from one to five; and "n" is an integer from one to three.

As used herein the term "(meth)acrylate" refers to methacrylate and/or acrylate groups.

Preferably at least 5 of said arms are present, and most preferably substantially all of said arms have their unattached ends terminated with an organo group containing a polymerizable carbon-carbon double (olefinic) bond. Such double bonds permit the star to copolymerize with other olefin, especially (meth)acrylic, monomers to form copolymers of the olefin monomers and the star polymer. Such copolymerization chemically incorporates the star polymer into the copolymer, as compared to simply physically mixing the star with another polymer or with the other monomers prior to polymerization of the other polymer. Such chemical incorporation results in improved resistance to extraction and greater reinforcement of properties, such as toughness, in the polymer combination.

BRIEF DESCRIPTION OF THE DRAWING

The Figure is a graph comparing the combination of oxygen permeability and hardness achieved in lenses made with random copolymers representative of the prior art and lenses of the present Examples made by incorporating star polymers of this invention in such random copolymers.

DETAILED DESCRIPTION OF THE INVENTION

Also preferred in this invention are silicone-containing acrylic star polymers which comprise:

a. a crosslinked core comprising a polymer derived from a mixture of monomers comprising i). 1–100% by weight of one or more monomers, each having at least two groups,

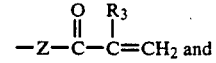

ii). 0–99% by weight of one or more monomers, each having one group,

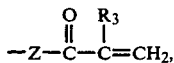

in which each $R_3$ is the same or different and is —H, —CH$_3$, —CH$_2$CH$_3$, —CN, or —COR', and Z is O or —NR' and b. attached to the core at least 5 polymer chains that are derived from a mixture of monomers comprising i). 15–90% by weight of one or more monomers having the formula

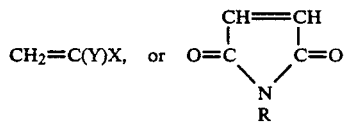

and mixtures thereof wherein: X is —CN, —CH=CHC(0)X' or —C(0)X'; Y is —H, —CH$_3$, —CN or —CO$_2$R, provided, however, when X is —CH=CHC(O)X', Y is —H or —CH$_3$; X' is —O-Si(R)$_3$, —R, —OR or —NR'R''; each R is independently selected from C$_{1-10}$ alkyl, alkenyl, or alkadienyl or C$_{6-20}$ cycloalkyl, aryl, alkaryl or aralkyl, any of said groups optionally containing one or more ether oxygen atoms within aliphatic segments thereof and optionally containing one or more functional substituents that are unreactive under polymerizing conditions; and each of R, and R' is independently selected from C$_{1-4}$ alkyl; and ii. about 10–100% by weight, preferably 15 to 50, of one or more polysiloxanylalkyl esters having the formula

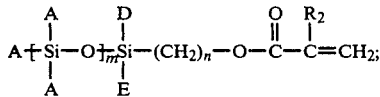

where D and E are selected from the class consisting of C$_1$-C$_5$ alkyl groups, phenyl groups, and groups of the structure

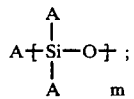

where A is selected from the class consisting of C$_1$-C$_5$ alkyl groups and phenyl groups; R$_2$ is selected from the group of hydrogen and methyl; m is an integer from one to five; and n is an integer from one to three, and c. the unattached ends of said arms having a terminal organo group containing a polymerizable carbon-carbon double bond.

Representative monofunctionally polymerizable monomers of the a.(ii.) group include, but are not limited to the following: methyl methacrylate (abbreviated herein as MMA), butyl methacrylate, ethyl methacrylate, methyl acrylate, ethyl acrylate, methacrylic acid, acrylic acid, hydroxyethyl methacrylate, hydroxyethyl acrylate, glyceryl methacrylate, sorbyl acrylate and methacrylate; 2-(dimethylamino)ethyl methacrylate, 2-(dimethylamino)ethyl acrylate; 3,3-dimethoxypropyl acrylate; 3-methacryloxypropyl acrylate; 2-acetoxyethyl methacrylate; p-tolyl methacrylate; 2,2,3,3,4,4,4-heptafluorobutyl acrylate; methylene malononitrile; ethyl 2-cyanoacrylate; N,N-dimethyl acrylamide; 4-fluorophenyl acrylate; 2-methacryloxyethyl acrylate and linoleate; propyl vinyl ketone ethyl 2-chloroacrylate; glycidyl methacrylate; 3-methoxypropyl methacrylate; 2[(1-propenyl)oxy]ethyl methacrylate and acrylate; phenyl acrylate; 2-(trimethyloloxy)ethyl methacrylate; allyl acrylate and methacrylate. Preferred monomers include methyl methacrylate, glycidyl methacrylate; sorbyl methacrylate; ethyl acrylate, butyl acrylate; sorbyl acrylate; 2-(trimethylsiloxy)ethyl methacrylate; 2-methacryloxyethyl acrylate, 2-acetoxyethyl methacrylate; and 2-(dimethylamino)ethyl methacrylate. Methyl methacrylate is most preferred because of its availability, cost and performance among other things. Representative polysiloxanylalkyl ester monomers which can be employed include: pentamethyldisiloxanylmethyl methacrylate, heptamethyltrisiloxanylethyl acrylete, tris(trimethylsiloxy)-gamma-(methacryloxypropyesilane which is abbreviated as TRIS, phenyltetramethyldisiloxanylethyl acrylate, phenyeetetraethyldisiloxanylether methacrylate, triphenyldimethyldis-.eeoxanylmethyl acrylate, isobueylhexamethyltrisiloxanylmethyl methacrylate, methyedi(trimethylsiloxy)-methacryloxymethylsilane, n-propyloctamethyltetrasiloxanyl propye methacrylate, pentamethyldi(trimethylsiloxy)acrylexymethylsilane, t-butyltetramethyldisiloxanylethylacrylate, n-pentylhexamethyltrisiloxanylmethyl methaerylate, and tri-i-propyltetramethyltrisiloxanylethylacrylate.

Examples of core monomers having at least two pelymerizable alpha, beta unsaturated acid esters or amedes as mentioned in a.(i.) above are: ethylene dimeteracrylate; 1,3-butylene dimethacrylate; tetraethylene glycol dimethacrylate; triethylene glycoe dimethacrylate; trimethylolpropane trimeacrylate; 1,6-hexylene dimethacrylate; 1,4-butylene dimethacrylate; ethylene diacrylate; 1,3-butylene diacrylate; tetraethylene glycol diacrylate; triethylene glycol diacrylate; trimecylolpropane triacrylate; 1,6-hexylene diacrylate; and 1,4-butylene diacrylate.

Other useful known ingredients and polymerization techniques will be found in U.S. Pat. No. 4,417,034—Webster, in columns 2–9 which is incorporated herein by reference.

In the preparation of the acrylic star block copolymers of the present invention, good use can be made of the known "group transfer" polymerization process of the general type described in part by Farnham and D. Y. Sogah, U.S. Pat. No. 4,414,372 and by O. W. Webster, U.S. Pat. No. 4,417,034 and in U.S. Pat. Nos. 4,508,880, Webster, Apr. 2, 1985, and 4,524,196 Farnham and granted June 18, 1985.

"Group transfer" initiators that are useful polymerization include but are not limited to the following: 1-(2-trimethylsiloxy)ethoxy-1-trimethylsiloxy-2-methylpropene, methoxy-[(2-methyl-1oxy]trimethylsilane; (trimethysilyl)isoronitrile; ethyl 2-(trimethylsilyl)acetate; methyl 2-(tributylstannyl)propanoate; [(2-methyl-1ohexenyl)oxy]tributylstannane; trimethylsilyl ile; methyl 2-methyl-2-(trimethylgermanyl) anoate; [(4,5-dihydro-2-furanyl)oxy]trimethylne; [(2-methyl-1-propenylidene)bis(oxy)]bismethylsilane][(2-methyl-1-[2-methoxymethoxy)xyl]-1-propenyl)oxy]trimethylsilane; methyl (trimethylxilyloxy)-1-propenyl)oxylate; [(1-(methoxymethoxy)-2-methyl-1-propenyl) silane; [(2-ethyl-1-propoxy-1-butenyl)

ilane; ethyl 2-(trimethylstannyl)
[(2-methyl-1-butenylidene)bis(oxy)]bismethyl-silane]2-(trimethylsilyl)propanenitrile; (trimethylgermanyl)acetate; [(1-((1-dec-2-enyl)-1-propenyl)oxy]-trimethylsilane; phenyl 2-(triethylsilyl)acetate; [(2-methyl-1-cyclohexeneyl)ox [(1-methoxy-2-methyl-1-oxy]phenyldimethylsilane.

Acrylic star polymers are high molecular polymers that have a multitude of linear, acrylic arms radiating out from a central core. The cores are highly crosslinked segments of difunctional acrylates or copolymers of monofunctional and difunctional acrylates. The arms are linear polymers that can be homopolymers, copolymers, or block polymers, and may have functional groups located at the end of the arms (or in some cases distributed along the chain). The manner in which star polymers of the present invention can be prepared include the "arm-first", "core-first", and "arm-core-arm" methods, as described for example in Spinelli U.S. Pat. No. 4,810,756, which is incorporated herein by reference.

Typically, the molecular weight of the arms of the star polymers of this invention can range from 1,000 to 20,000. The preferred range based on performance and handling is from 5,000 to 14,000. The number of arms per star is dependent on the composition and process used to make the star. The number of arms that are present in a star can be determined by dividing the molecular weight of the entire star by the molecular weight of the arms from which it was made. The number of arms can range preferably from 5 to 5,000. A more preferred range is 10 to 200. The molecular weight of both the arms and the star can be determined by using standard analytical techniques, such as gel permeation chromatography, light scattering, and osmometry. Factors affecting the number and length of arms in star polymers of the present invention are the same as known and described in U.S. Pat. No. 4,810,756 the disclosure of which is incorporated above.

Known conventional gas permeable lens formulations include slightly crosslinked copolymers of MMA and TRIS. The ratio of the two monomers is adjusted to optimize a balance of properties. As the level of TRIS monomer is increased, the permeability of the contact lens increases, but the hardness and flex resistance decreases. The amount of TRIS which can be used is limited by the minimum hardness that is acceptable for manufacturability. Typically, a minimum Shore D hardness of 70 is needed for good manufacturing (machineability) of lenses. This, in copolymers of the prior art, normally results in a maximum oxygen permeability (DK) of about 40.

Hard polymers, such as PMMA, are not very soluble in highly permeable monomers, such as TRIS. It has been found that if the polymer is made into a block polymer of the TRIS silicone monomer, for example, and MMA, then the block copolymer can be dissolved or dispersed into the TRIS monomer. With this procedure, solutions of hard polymers in the silicone monomer have been made and copolymerized to make lenses with outstanding properties. In general, the use of the block polymer structure significantly improves the ease of making the polymer solutions. Other soluble hard polymer/permeable monomer mixtures may also be used.

Useful star polymers of this invention include but are not limited to the following (The values given represent the weight percent of each monomer in the polymer. A double slash indicates a separation between blocks, and a single slash indicates a random copolymer or random composition in a specific block. In each case EGDM is the core monomer.):

| Composition | Block Next to Double Bond* | Molecular Weight Arm Mn |
|---|---|---|
| TRIS//MMA//EGDM 37.3//55.1//7.6 | TRIS | 8,600 |
| PENTA//MMA//EGDM 38.8//56.8//4.4 | PENTA | 9,900 |
| TRIS//MMA//EGDM 36.6//55.2//8.2 | TRIS | 10,000 |
| TRIS//MMA//EGDM 77.9//15.0//7.1 | TRIS | 10,200 |
| TRIS//MMA//EGDM 22.9//70.0//7.1 | TRIS | 10,000 |
| TRIS//MMA//EGDM 9.7//83.0//7.3 | TRIS | 9,200 |
| PENTA//MMA//EGDM 17.3//79.2//3.5 | PENTA | 14,200 |
| MMA//TRIS//EGDM 23.2//69.6//7.2 | MMA | 10,200 |
| MMA//TRIS//EGDM 9.3//82.5//7.2 | MMA | 8,000 |
| MMA/TRIS//EGDM 24.3/68.6//7.1 | RANDOM | 10,300 |
| MMA/TRIS//EGDM 42.9/43.4//13.7 | RANDOM | 10,300 |
| MMA/TRIS//EGDM 60.0/26.4//13.6 | RANDOM | 10,300 |
| MMA/TRIS//EGDM 68.4/18.2//13.4 | RANDOM | 10,300 |

MMA = methyl methacrylate
TRIS = 3-tris(trimethylsiloxy)silanepropyl methacrylate
EGDM = ethyleneglycol dimethacrylate
PENTA = 3-methacryloxypropylpentamethyldisiloxane
*i.e. in the form of an alpha-methylstyrene organo group containing a carbon—carbon double bond, the group is linked to the end of the arm by a urethane linkage formed by the reaction of an isocyanate group and a hydroxy group.

Especially preferred star polymers include:

| Composition | Block Next to Double Bond | Molecular Weight Arm Mn |
|---|---|---|
| TRIS//MMA//EGDM 36.6//55.2//8.2 | TRIS | 10,000 |
| TRIS//MMA//EGDM 22.9//70.0//7.1 | TRIS | 10,000 |
| TRIS//MMA//EGDM 9.7//83.0//7.3 | TRIS | 9,200 |
| PENTA//MMA//EGDM 38.8//56.8//4.4 | PENTA | 9,900 |

Included in the composition of the star polymers, especially in the arms, may also be some (meth)acrylate monomers whose function is to improve wetting or deposit resistance, in lens polymers for example. Examples of these monomers include: methacrylic acid, acrylic acid, dimethylaminoethyl methacrylate, diethylaminoethyl methacrylate, glyceryl methacrylate. Other polymers containing such monomers may be mixed with the polymers of this invention or in lens compositions as well.

The polymerizable double bond can be in an organo group that is attached to the ends of the arms of the stars and may be in the form of a methacryloxy, an acryloxy, a styrenic, an alphia methyl styrenic, an allylic, a vinylic, or other olefinic groups. It can be attached to star polymer by reacting a functional group on the star arm with compounds that contain a polymerizable double bond and react with said functional group. Such compounds include, for example, any that has a second functional group that can react with the first functional group and contain a polymerizable double bond. Examples of such functional groups that can be present on the star polymer include hydroxy, carboxylic acid, epoxy and aziridine. The functional group may intially be present in blocked form, which requires the removal of the blocking group before attachment of the polymerizable double bond group. The functional group may be incorporated in the arm polymer through either a functional initiator or a functional terminal monomer. Examples of the second functional groups include epoxy, hydroxy, acid, aziridine, isocyanate, acid chloride, anhydride, and ester.

Initiators having blocked hydroxyl groups which can be used include 1-(2-trimethylsiloxyethoxy)-1-trimethylsiloxy-2-methyl propene and 1-[2-(methoxymethoxy)ethoxy]-1-trimethylsiloxy-2-methylpropene. Blocked hydroxyl monomers which can be used include 2-(trimethylsiloxy)ethyl methacrylate, 2-(trimethylsiloxy)propyl methacrylate, and 3,3-dimethoxypropyl acrylate. When the polymerization is completed, the blocking group is removed by hydrolysis to give a hydroxy functional polymer. Examples of hydroxy functional monomers which can be blocked include: 2-hydroxyethyl acrylate, 2-hydroxyethyl methacrylate, hydroxypropyl acrylate, and hydroxypropyl acrylate.

Upon unblocking, the hydroxy group is then reacted with compounds that can attach a polymerizable double bond group to the polymer. Examples of these include: 2-isocyanatoethyl methacrylate, methacryloyl chloride, acryloyl chloride, alpha-methylstyrene isocyanate, acrylic acid, methacrylic acid, anhydrides of acrylic and methacrylic acid, maleic anhydride, and esters of acrylic and methacrylic acids in transesterification reactions.

Blocked acid initiators which can be used include 1,1-bis(trimethylsiloxy)-2-methyl propene and 1,1-bis(trimethylsiloxy)propene. Blocked acid monomers which can be used include trimethylsiloxy methacrylate and 1-butoxyethyl methacrylate. When the polymerization is completed, the blocking group is removed to give an acid functional polymer. Acid 5 monomers which can be used include acrylic acid, itaconic acid, and methacrylic acid.

The acid group is then reacted with compounds that can attach a polymerizable double bond group to the polymer. Examples of these include: glycidyl acrylate and methacrylate, aziridinyl acrylate and methacrylate, the hydroxy esters of acrylic and methacrylic acid.

The star polymers of this invention, used alone, or self-polymerized, or when copolymerized with other (meth)acrylic monomers through the terminal carbon-carbon double bonds on the arms, have utility in polymer formulations, especially those of U.S. Pat. Nos. 4,861,840, 3,808,178 and 4,120,570, for use in such diverse applications as release coatings, contact lenses, ocular membranes, intraocular implants, sizing agents, electronics adhesives, gas and liquid separation membranes, prostheses, and etching resists.

Test Methods

Oxygen Permeability

Oxygen permeabilities are determined using standard techniques, such as in ASTM-D-1434, as described for example in U.S. Pat. No. 3,808,178 at Column 4, lines 36–44.

The values given are the diffusion constants:

$$DK = X \, 10^{11} \frac{cm^3 cm}{s \, cm^2 mm \, Hg}.$$

Hardness

A Shore D hardness tester was used in the conventional manner (e.g. ASTM E448-82) to determine hardness of buttons made either from a button mold or cut from a tube. A suitable tester is a Model D Hardness Tester from Shore Instrument and Manufacturing Co., Inc.

Swelling

A faced button was weighed and soaked in a container in heptane or ethyl alcohol for 18 hours. The container was placed in a water bath at room temperature. The button was taken out and wiped dry with a paper towel. The different in weight of the button before and after soaking is recorded and the percentage increase in weight is calculated based on the original weight of the button.

COMPARATIVE EXAMPLES (Not of the Invention)

This describes the preparation of a conventional contact lens made with the random copolymerization of monomers.

Formulation

The following materials were mixed together: 51.8 gm of methyl methacrylate, MMA, 36.0 gm of 3-tris(-trimethylsiloxy)silanepropyl methacrylate, TRIS, 7.0 gm of N-vinyl pyrolidone, NVP, 5.0 gm of tetraethyleneglycol dimethacrylate, TEGMA, and 0.2 gm of "Vazo-52", a commercial free-radical initiator. The solution was poured in button molds, tubes, or in a caste base curve radius type mold.

Methods of Polymerization

Method 1: Thermal polymerization. The mixture was heated in the mold at 30.C for 44 hours, then 4 hours at 45.C, finally 24 hours at 110° C.

Lens Manufacturing

A lathe cut lens from the samples using standard production procedures.

Results

The above formulation was used to make lens that had a Shore D hardness of 75 and a DK of 17.0.

A series of six more polymers, and lenses thereof, was made and tested in substantially the same manner while varying the ratio of the TRIS and MMA monomers with the same amounts of NVP and TEGMA. The results are as follows:

| Comparison Run | Formulation (Wt. in gms) | | Properties | |
|---|---|---|---|---|
| | TRIS | MMA | DK | Hardness |
| 1 | 36 | 51.8 | 17 | 75 |
| 2 | 48 | 39.8 | 35 | 70 |
| 3 | 53 | 34.8 | 34.5 | 64 |
| 4 | 55 | 32.8 | 36.9 | 60.5 |
| 5 | 60 | 27.8 | 47.3 | 58 |
| 6 | 66 | 21.8 | 70.0 | 54.0 |
| 7 | 70 | 17.8 | Too soft | |

The above table shows results that are typically obtained with conventional random copolymerization of a hard monomer MMA and a permeable monomer TRIS. Lenses made with the formulations of Comparisons 4, 5, 6 and 7 are considered to be of inferior commercial quality. They were too soft to properly cut and lathe, were easily scratched, and were solvent sensitive, i.e., they had over 15% solvent swelling.

The results from Comparisons 1 to 7 are exemplary for lenses made from a random copolymerization of hard monomer such as MMA and a permeable monomer such as TRIS. These results show that as the level of permeable monomer is increased, the oxygen permeability is increased, but the hardness of the lens decreases.

In the above formulations the N-vinyl pyrrolidone was added to improve the wetting characteristics of the finished lens. Other wetting monomers that could have been used include methacrylic acid, acrylic acid, hydroxyethyl methacrylate, and glyceryl methacrylate. It is thought that their use at less than 10% does not affect either the permeability or hardness of the lenses.

The tetraethylene glycol dimethacrylate was added to crosslink the lens and improve the swell resistance of the finished lens. Other crosslinking monomers that could have been used include ethyleneglycol dimethacrylate, diethyleneglycol dimethacrylate, and trimethylolpropane trimethacrylate TMPTMA. It is thought that their use at less than 8% does not affect permeability.

Others monomers, such as hexafluorobutyl methacrylate, styrene, t-butylstyrene, etc. can be used to improve some properties, such as deposit resistance. Their use at less than 10% of the total composition does not significantly affect either permeability or hardness.

Preparation Procedure for Lenses Made with Star Polymers of the Invention

I. Mixing Procedure

All liquid ingredients were weighed and mixed in screw-on-cap bottle, shaken and stirred for a while. The solid star powder (from Examples 1 or 2) is weighed and added to the liquid monomer ingredients in small portions. In order to disperse the power in the bulk of the mixture, after each addition the mixture was stirred using a magnetic stirrer, the bottle then capped and sealed properly, tumbled on a roller mill until the solution was clear and homogeneous (from several hours to several days). The initiator and any color were added and tumbled for half an hour, then poured in molds or tubes.

Polymerization Procedure

Thermal Polymerization

Solutions were poured in, nitrogen flushed aluminum tubes, capped and put in a water bath for 44 hours at 30° C. Then heated in an oven for 4 hours at 45° C, finally the temperature was raised to 110° C for 24 hours. Sometimes an extra 24 hours at 130° C was used. The tubes were cooled to room temperature and the rods were punched out. The rods were ground to the half inch diameter and cut to buttoms. These buttoms were then cut and lathed into lenses.

The Ultraviolet Method

After the solution is prepared, it was poured in UV-transparent button molds and placed in a UV box. Nitrogen and vacuum was applied alternatively. Irradiation was applied for 45 minutes under nitrogen atmosphere. The molds were then removed and heated for two hours at 90° C, then the temperature was raised to 110° C for 20 hours. Buttons were punched out of the molds and faced.

Lens Manufacturing

A lathe was used to cut lenses using standard production procedures.

EXAMPLES

In the examples that follow, the compositions are expressed in terms of the weight ratios of the ingredients based on total weight of the composition.

Example 1 TRIS//MMA//EGDM 36.6//55.2//8.2 STAR

This describes the preparation of a star polymer that has arms composed of a block of TRIS [3-methacryloxypropyltris(trimethylsiloxy)silane] monomer units and a block of MMA monomer units. The core is derived from ethyleneglycol dimethacrylate. There is an organo group containing a double bond located at the ends of the arms next to the TRIS block.

A 1 liter flask was equipped with a mechanical stirrer, thermometer, $N_2$ inlet, drying tube outlet and additional funnels. TRIS, 60.54 gm; THF, 38.38; p-xylene, 3.01 gm; tetrabutylammonium m-chlorobenzoate, 300 microliters of a 1.0 M solution; and bis(dimethylamino)methylsilane, 400 microliters, were charged to the flask. Initiator, 1-(2-trimethylsiloxy)ethoxy-1-trimethylsiloxy-2-methylpropane, 4.19 gm was injected and the TRIS block of the arms was polymerized. Feed I [THF, 5.62 gm; tetrabutylammonium m-chlorobenzoate, 300 microliters of a 1.0 M solution] was then started and added over 60 minutes. Feed II to form the attached MMA block [methyl methacrylate, 91.30 gm; THF, 146.88 gm] was started and added over 15 minutes. Feed III to form the core of the lining ends of the arms [ethyleneglycol dimethacrylate, 13.56 gm] was started at 30 minutes after the end of Feed II and added over 10 minutes. At 100 minutes after the end of Feed III, the reaction was quenched with methanol, 3.56 gm; water, 1.98 gm; dichloroacetic acid, 7 microliters to deactivate the living polymer. It was refluxed for 3 hours to unblock by hydrolysis the blocked hydroxyl groups. Solvent, 279.8 gm, was distilled off while 378.12 gm of toluene was added. Distillation was continued until the vapor temperature equaled approximately 108° C. Then dibutyltin dilaurate, 55 microliters; and alpha-methylstyrene isocyanate (TMI from Am. Cyanamid), 5.57 gm, were added and refluxed for 3 hours. This put a reactive double bond in an organo group at the end of each arm of the star from the reaction of the isocyanate group with the hydroxyl groups to form a urethane linkage. Methanol, 0.62 gm, was added and refluxed 30 minutes. The polymer solution was then poured into methanol. The solid star polymer precipitated out and was dried.

This made a star polymer of TRIS//MMA 40//60 arms with a polymerizable double bond at the end of the arms. The arms have a Mn of about 10,000. The star has a Mw of 240,000.

Example 2 TRIS//MMA//EGDM 22.9//70.0//7.1 STAR

This describes the preparation of a star polymer that has arms composed of a block of TRIS and a block of MMA. The core is from ethyleneglycol dimethacrylate.

A double bond is contained at the ends of the arms next to the TRIS block.

A 1 liter flask was equipped with a mechanical stirrer, thermometer, N₂ inlet, drying tube outlet and addition funnels. 3-Methacryloxypropyltris(trimethylsiloxy)silane, 76.79 gm; THF, 18.74; p-xylene, 4.66 gm; tetrabutylammonium m-chlorobenzoate, 500 microliters of a 1.0 M solution; and bis(dimethylamino)methylsilane, 500 microliters, were charged to the pot. Initiator, 1-(2-trimethylsiloxy)ethoxy-1-trimethyl- siloxy-2-methylpropene, 8.43 gm was injected and the TRIS block of the arms was polymerized. Feed I [THF, 5.62 gm; tetrabutylammonium m-chlorobenzoate, 300 microliters of a 1.0 M solution]was then started and added over 60 minutes. Feed II to form the MMA blocks [methyl methacrylate, 234.3 gm; THF, 391.2 gm, and bis(dimethylamino)methylsilane, 500 microliters] was started and added over 15 minutes. To form the core Feed III [ethyleneglycol dimethacrylate, 24.02 gm] was started at 30 minutes after the end of Feed II and added over 10 minutes. At 100 minutes the reaction was quenched with methanol, 5.92 gm; H₂O, 2.47 gm; dichloroacetate acid, 15 microliters to deactivate the living polymer. It was refluxed for 3 hours to unblock the hydroxyl groups in the initiator end of the arms. Solvent, 699.8 gm was distilled off while 888.12 gm of toluene was added. The flask was distilled until the vapor temperature equaled approximately 108.C. Then dibutyltin dilaurate, 155 microliters; and a methylstyrene isocyanate (TMI from Am. Cyanamid), 7.61 gm, were added and refluxed for 3 hours. This puts a reactive styrene double bond in a group at the end of each arm of the star. Methanol, 0.62 gm, was added and refluxed 30 minutes. Butanol, 5.1 gm, was added and refluxed 30 minutes. The polymer solution was then poured into methanol. The solid star polymer precipitated out and was dried.

This made a star polymer of TRIS//MMA of 25//75 with a polymerizable double bond in a group at the end of each arm. The arms have a Mn of about 10,000. The star has a Mw of 280,000.

Examples 3–10

Using the star polymer of Example 1, polymers of the following formulations was prepared and made into lenses using the above described preparation procedure:

| | Formulation | | | | | | | Properties | |
|---|---|---|---|---|---|---|---|---|---|
| No. | TRIS | MMA | STAR | NVP | MAA | TMPTMA | Vazo-52 | DK | Hardness |
| 3 | 35 | 35.3 | 15 | 5 | 5 | 4.5 | 0.2 | 25 | 83 |
| 4 | 50 | 22.8 | 20 | 7 | — | — | 0.2 | 47.2 | — |
| 5* | 45.5 | 15.7 | 24.3 | — | — | 5 | 0.2 | 58 | 76.2 |
| 6 | 53.7 | 7.5 | 27.5 | 6.5 | — | 4.6 | 0.2 | 91.0 | 78 |

*Example 5 also used 6.0% hexafluorobutyl methacrylate and 3.5% glyceryl methacrylate in its formulation.

This Example used the start polymer that was prepared in Example 2.

| | Formulation | | | | | Properties | |
|---|---|---|---|---|---|---|---|
| No. | TRIS | MMA | STAR | MAA | TEGMA | Vazo-52 | DK | Hardness |
| 7 | 29 | 15.8 | 45 | 5 | 5 | 0.2 | 61 | 82 |

The following Examples used the star polymer made in Example 1.

| | Formulation | | | | | | | Properties | |
|---|---|---|---|---|---|---|---|---|---|
| No. | TRIS | VIN* | MMA | STAR | NVP | MAA | TMPTMA | Vazo-52 | DK | Hardness |
| 8 | 27.4 | 27.4 | 5.5 | 25 | 4 | 5 | 5.5 | 0.2 | 67 | 79 |
| 9 | 34.8 | 20 | 5.5 | 25 | 4 | 5 | 5.5 | 0.2 | 69 | 80 |
| 10** | — | 48.8 | 5 | 25 | 5 | 5 | 5 | 0.2 | 52 | 83 |

*VIN = 3-[3-methacryloxypropyl-1,3,3-tris(trimethyl-siloxy)-1-methyl-1-vinyldisiloxane]
**Example 10 also used 6.0% hexafluorobutyl methacrylate in its formulation.

Examples 3 to 10 clearly show the advantages of star polymers of the inention used in contact lens formulations. All of the lenses made in these formulations were hard, easy to cutand lathe, resistant to scratches, and had less than 15% solvent swell. The combinations of hardness and oxygen permeability of lenses made with these materials are significantly greater than those obtained with random copolymers as listed in Comparisons 1–7. The Figure plots the results of Comparison Runs 1–6 with Examples 3, 5, 6 and 7.

The use of stars did not adversely affect the optical clarity or hardness values of the lenses.

I claim:

1. A novel silicone-containing acrylic star polymer comprised of a crosslinked core derived from one or more (meth)acrylate monomers and attached to the core at least 5 linear copolymeric arms, each with an unattached free end, which arms are derived from one or more (meth)acrylate monomers, wherein about 5 to 100% by weight of the (meth)acrylate monomers from which the arms are derived are in the form of a block consisting essentially of one or more monofunctional monomeric polysiloxanylalkyl ester units.

2. A polymer of claim 1 wherein the polysiloxanylalkyl esters are of the formula:

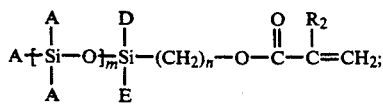

wherein D and E are selected from the group consisting of $C_1$–$C_5$ alkyl groups, phenyl groups and a group of the structure

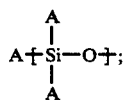

where A is selected from the group consisting of $C_1$–$C_5$ alkyl groups and phenyl groups; $R_2$ is selected from the group of hydrogen and methyl; "m" is an integer from one to five; and "n" is an integer from one to three.

3. A polymer of claim 2 wherein at least 5 of said arms have their unattached end terminated with an organo group containing a polymerizable carbon-carbon double bond.

4. A polymer of claim 3 wherein said organo group is attached to a block of said polysiloxanylalkyl ester monomer units.

5. A polymer of claim 2 which comprises:
   a. a crosslinked core comprising a polymer derived from a mixture of monomers comprising
      i). 1-100% by weight of one or more monomers, each having at least two groups,

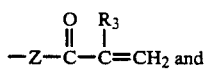

ii). 0-99% by weight of one or more monomers, each having one group,

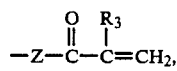

in which each $R_3$ is the same or different and is —H, —$CH_3$, —$CH_2CH_3$, —CN, or —COR' and Z is O, or —NR' and
   b. attached to the core at least 5 polymer chains that are derived from a mixture of monomers comprising
      i). about 0–90% by weight of one or more monomers having the formula

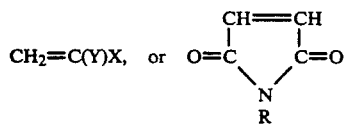

and mixtures thereof wherein: X is —CN, —CH=CHC(0)X' or —C(0)X'; Y is —H, —$CH_3$, —CN or —$CO_2R$, provided, however, when X is —CH=CHC(0)X', Y is —H or —$CH_3$; X' is —OSi(R)$_3$, —R, —OR or —NR'R"; each R is independently selected from $C_{1-10}$ alkyl, alkenyl, or alkadienyl or $C_{6-20}$ cycloalkyl, aryl, alkaryl or aralkyl, any of said groups optionally containing one or more ether oxygen atoms within aliphatic segments thereof and optionally containing one or more functional substituents that are unreactive under polymerizing conditions; and each of R' and R' is independently selected from $C_{1-4}$ alkyl; and ii). 10–100% by weight of one or more polysiloxanylalkyl esters having the formula

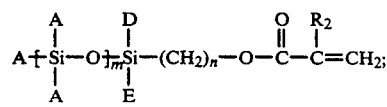

where D and E are selected from the class consisting of $C_1$–$C_5$ alkyl groups, phenyl groups, and groups of the structure

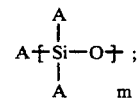

where A is selected from the class consisting of $C_1$–$C_5$ alkyl groups and phenyl groups; $R_2$ is selected from the group of hydrogen and methyl; m is an integer from one to five; and n is an integer from one to three; and
   c. the unattached ends of said arms having a terminal organo group containing a polymerizable carbon-carbon double bond.

6. A polymer of claim 5 wherein the core is derived from ethylene glycol dimethacrylate, and the arms are comprised of a block of methyl methacrylate units and a block of 3-methacryloxypropyl-tris(trimethylsiloxy) silane units.

7. A polymer of claim 5 wherein the arms have a number average molecular weight of from 1,000 to 20,000.

8. A polymer of claim 5 wherein the number of arms is from 10 to 200.

9. A polymer of claim 8 wherein the star has a weight average molecular weight of from about 50,000 to 500,000.

10. A polymer of claim 5 wherein said polymer chains are comprised of from 15 to 50% by weight of said polysiloxanylalkyl esters.

11. A polymer of claim 10 wherein the terminal organo group is derived from alpha-methylstyrene isocyanate.

* * * * *